(12) United States Patent
Li et al.

(10) Patent No.: US 11,217,225 B2
(45) Date of Patent: Jan. 4, 2022

(54) MULTI-TYPE ACOUSTIC FEATURE INTEGRATION METHOD AND SYSTEM BASED ON DEEP NEURAL NETWORKS

(71) Applicant: XIAMEN UNIVERSITY, Fujian (CN)

(72) Inventors: Lin Li, Fujian (CN); Zheng Li, Fujian (CN); Qingyang Hong, Fujian (CN)

(73) Assignee: XIAMEN UNIVERSITY, Fujian (CN)

(*) Notice: Subject to any disclaimer, the term of this patent is extended or adjusted under 35 U.S.C. 154(b) by 0 days.

(21) Appl. No.: 17/154,801

(22) Filed: Jan. 21, 2021

(65) Prior Publication Data

US 2021/0233511 A1    Jul. 29, 2021

(30) Foreign Application Priority Data

Jan. 22, 2020 (CN) .......................... 202010073244.8

(51) Int. Cl.
*G10L 15/02* (2006.01)
*G06N 3/04* (2006.01)
(Continued)

(52) U.S. Cl.
CPC .............. *G10L 15/02* (2013.01); *G06N 3/04* (2013.01); *G06N 3/08* (2013.01); *G10L 15/01* (2013.01);
(Continued)

(58) Field of Classification Search
CPC ....... G10L 15/01; G10L 15/063; G10L 15/16; G10L 15/22; G10L 15/02; G06N 3/04; G06N 3/08
See application file for complete search history.

(56) References Cited

U.S. PATENT DOCUMENTS 9,799,327 B1 * 10/2017 Chan ........................ G06F 40/12
2018/0261225 A1    9/2018 Watanabe et al.
(Continued)

FOREIGN PATENT DOCUMENTS

CN    110335592 A    10/2019
CN    110444223 A    11/2019
(Continued)

OTHER PUBLICATIONS

"Attention Is All You Need", Ashish Vaswani et al., Advances in neural information processing systems, pp. 6008-5998, 2017.
(Continued)

*Primary Examiner* — Michael Colucci
(74) *Attorney, Agent, or Firm* — Calfee Halter & Griswold LLP (57) ABSTRACT

The application discloses a multi-type acoustic feature integration method and system based on deep neural networks. The method and system include using labeled speech data set to train and build a multi-type acoustic feature integration model based on deep neural networks, to determine or update the network parameters of the multi-type acoustic feature integration model; the method and system includes inputting the multiple types of acoustic features extracted from the testing speech into the trained multi-type acoustic feature integration model, and extracting the deep integrated feature vectors in frame level or segment level. The solution supports the integrated feature extraction for multiple types of acoustic features in different kinds of speech tasks, such as speech recognition, speech wake-up, spoken language recognition, speaker recognition, and anti-spoofing etc. It encourages the deep neural networks to explore internal correlation between multiple types of acoustic features according to practical speech tasks, to improve the recognition accuracy and stability of speech applications.

9 Claims, 8 Drawing Sheets

(51) Int. Cl.
- *G06N 3/08* (2006.01)
- *G10L 15/01* (2013.01)
- *G10L 15/06* (2013.01)
- *G10L 15/16* (2006.01)
- *G10L 15/22* (2006.01)

(52) U.S. Cl.
CPC ............ *G10L 15/063* (2013.01); *G10L 15/16* (2013.01); *G10L 15/22* (2013.01)

(56) References Cited

U.S. PATENT DOCUMENTS

| | | | |
|---|---|---|---|
| 2019/0121877 A1* | 4/2019 | Vyas | G06N 3/084 |
| 2019/0294729 A1* | 9/2019 | Jiang | G06K 9/00718 |
| 2020/0104421 A1* | 4/2020 | Meng | G06F 16/3347 |
| 2020/0160050 A1* | 5/2020 | Bhotika | G06K 9/00463 |
| 2020/0210776 A1* | 7/2020 | Xiong | G06F 40/35 |
| 2020/0210810 A1* | 7/2020 | Vila Casado | G06K 9/6273 |

FOREIGN PATENT DOCUMENTS

| | | |
|---|---|---|
| CN | 110459202 A | 11/2019 |
| CN | 110459241 A | 11/2019 |
| CN | 110473518 A | 11/2019 |
| CN | 110473529 A | 11/2019 |
| CN | 110491391 A | 11/2019 |

OTHER PUBLICATIONS

Search Report for Chinese Patent Application No. 2020100732448 dated Aug. 14, 2020.

\* cited by examiner

MULTI-TYPE ACOUSTIC FEATURE INTEGRATION METHOD AND SYSTEM BASED ON DEEP NEURAL NETWORKS

CROSS-REFERENCE TO RELATED APPLICATIONS

This application claims priority under 35 U.S.C. § 119 from Chinese Application No. 202010073244.8, having a priority date of Jan. 22, 2020. The entire content of the aforementioned Chinese Application is incorporated herein by reference.

TECHNICAL FIELD

The application relates to the technical field of speech recognition, and in particular to a multi-type acoustic feature integration method and system based on deep neural networks.

BACKGROUND

With the rapid development of computer technology and communication technology, more and more speech applications and technologies have been proposed in recent years. Common speech tasks comprise: speech recognition, speech wake-up, spoken language recognition, speaker recognition, anti-spoofing, etc. These speech tasks have been referred to as extensive and important applications in many technology fields, such as mobile phone speech assistants and smart speakers for consumer terminals, and speaker-id locks for devices in the security field.

On the one hand, the speech applications' environment is relatively complicated. In practical conditions, the recognition rates of speech tasks usually degrade, and the performances are also affected by factors such as distance, location, speaker's psychology condition, and physiology condition. In addition, it is quite difficult to design the most appropriate acoustic feature configuration for different speech tasks, which leads to the disadvantages of current speech applications, such as weak stability and weak self-adaptability.

On the other hand, it's common to extract only a single type of acoustic feature from a speech sample as the input data of the speech task. And the popular acoustic features are designed with professional knowledge and experimental experience in the acoustic signal processing field. If the system models only deploy a single kind of artificially designed acoustic feature as the input data for the various speech tasks in complex and challengeable application scenarios, insufficient expression of the specific speech task would become a big issue, which will affect the recognition accuracy and system robustness.

Therefore, how to explore the most essential feature expressions of speech signal in the specific speech task, to further train a high-precision and high-stability speech model has become a research hotspot.

SUMMARY

The purpose of this application is to propose a multi-type acoustic feature integration method based on deep neural networks. Through the extraction of integrated vectors from multi-type acoustic features in a speech task, the method and system encourage the deep neural networks to explore internal correlation between multiple types of acoustic features according to practical speech tasks, to improve the recognition accuracy and stability of speech applications.

In the first aspect, an embodiment of the present application provides a multi-type acoustic feature integration method based on deep neural networks, the method comprising:

Step S1: training a multi-type acoustic feature integration model based on deep neural networks using labeled speech data set, wherein the deep neural networks comprise at least two subnetwork branches for shallow-layer features, and a feature integration network that supports multiple acoustic features, wherein contribution weights are calculated with attention mechanism for at least two types of shallow-layer features in frame level, and used to weight the shallow-layer features in frame level, wherein deep integrated features are obtained in the feature integration network by dimension reduction or normalization processing on concatenation or accumulation of different types of weighted shallow-layer features in frame level, and wherein the network parameters of the multi-type acoustic feature integration model are obtained or updated;

Step S2: inputting multiple types of acoustic features extracted from the testing speech to the trained multi-type acoustic feature integration model, and extracting frame-level deep integrated feature vectors.

In this method, the distinction and complementarity between different types of multi-type frame-level acoustic features are employed to train a multi-type acoustic feature integration model with relevant network parameters for the specific speech task, and the trained multi-type acoustic feature integration model is used to complete the specific speech task with high accuracy and stability.

In some specific embodiments, the deep neural networks in Step S1 comprise at least two subnetwork branches for shallow-layer features, a feature integration network that supports multiple acoustic features, at least two fully connected hidden layers, and an output layer for specific speech tasks. The realization of the neural networks for multi-type acoustic feature integration model is completed based on the sub-network structures mentioned above.

In some specific embodiments, Step S1 specifically comprises the following sub-steps:

Step S11: extracting at least two different types of frame-level acoustic features from each speech sample in the labeled speech data set;

Step S12: inputting at least two different types of frame-level acoustic features into subnetwork branches for shallow-layer features respectively, wherein the shallow-layer features in frame level are obtained according to different types of acoustic features;

Step S13: with the attention mechanism, inputting the frame-level shallow-layer feature vectors to the feature integration network to obtain a frame-level deep integrated feature vector;

Step S14: inputting the frame-level deep integrated feature vectors to the hidden layers and transmitting to the output layer in sequence, and wherein after the loss function calculation according to the specific speech task, the network parameters of the whole deep learning networks are updated with backpropagation algorithm.

In this method, multiple different types of frame-level acoustic features are extracted for the speech sample, and then transmitted through the subnetwork branch for shallow-layer features respectively, the feature integration network and speech task processing stage in sequence, and wherein all the network parameters of the deep neural networks are obtained, and the idiographic parameters in the multi-type acoustic feature integration model are determined.

In some specific embodiments, Step S14 may further comprise: inputting the frame-level deep integrated feature vectors into the statistics pooling layer to obtain segment-level deep integrated feature vectors, wherein the statistics pooling layer is set between the feature integration network and two higher level fully connected hidden layers, wherein the segment-level deep integrated feature vectors are input to the hidden layers and transmitted to the output layer in sequence, wherein after the loss function calculation according to the specific speech task, the network parameters are updated with backpropagation algorithm.

When it is for a segment-level speech task, after Step S13, the frame-level shallow-layer feature vectors are input to the statistics pooling layer to obtain segmental-level deep integrated feature vectors through the pooling processing from frame level to segment level.

In some specific embodiments, the method of obtaining the frame-level deep integrated feature vectors in Step S13 specifically comprises: contribution weights are calculated with attention mechanism for at least two types of shallow-layer features in frame level, wherein deep integrated features are obtained in the feature integration network by dimension reduction or normalization processing on concatenation or accumulation of different types of weighted shallow-layer features in frame level, wherein dimension reduction or normalization processing is performed after the weighted integration processing at the integration layer, wherein the feature integration network comprises a fully connected layer with the attention mechanism, an integration layer, and a fully connected layer, wherein deep integrated features are obtained in the feature integration network by dimension reduction or normalization processing on the frame-level preliminary integrated feature vectors.

In some specific embodiments, the weighted integration processing comprises: weighting the shallow-layer features in frame level with the corresponding contribution weight, and performing concatenation or accumulation processing. The mathematical formula of the concatenation processing is as follows:

$$I = \text{Concat}(a_1 F_1, a_2 F_2, \ldots, a_N F_N)$$

where I represents the frame-level preliminary integrated feature vectors, function Concat ( ) represents a concatenation operation, $F_1, F_2, \ldots, F_N$ represent the frame-level shallow-layer feature vectors, and $a_1, a_2, \ldots, a_N$ represent the corresponding contribution weights, and N represents the number of types of frame-level acoustic features.

The mathematical formula of the accumulation processing is as follows:

$$I = \sum_{i=1}^{N} a_i F_i$$

where I represents the frame-level preliminary integrated feature vectors, $F_i$ represents the frame-level shallow-layer feature vectors, $a_i$ respectively represents the corresponding contribution weight, and N represents the number of types of frame-level acoustic features.

In some specific embodiments, in the Step S2, according to the specific speech tasks, the different types of acoustic features for the testing speech are put into the trained multi-type acoustic feature integration model, and the frame-level deep integrated feature vectors of the testing speech are extracted from the feature integration network. The frame-level deep integrated feature vectors are suitable for the test requirements of frame-level speech tasks.

In some specific embodiments, the different types of acoustic features for the testing speech are put into the trained multi-type acoustic feature integration model, and the segment-level deep integrated feature vectors of the testing speech are extracted from the statistics pooling layer. The segment-level deep integrated feature vectors are suitable for the test requirements of segment-level speech tasks.

In the second aspect, an embodiment of the present application provides a computer-readable storage medium with a computer program stored thereon, the method according to any one of the foregoing embodiments is executed when the program is executed by a processor.

In the third aspect, an embodiment of the present application provides a system for integrating multiple types of acoustic features based on deep neural networks, the system comprising:

acoustic feature extraction unit which is configured to preprocess a testing speech sample and extract at least two different types of frame-level acoustic features of the testing speech;

shallow feature unit which is configured for at least two different types of shallow-layer feature network branches, wherein it receives different types of the frame-level acoustic features of the testing speech respectively, and wherein it outputs frame-level shallow-layer feature vectors of the testing speech in each subnetwork branch;

feature integration unit wherein the contribution weights are calculated with attention mechanism for at least two types of shallow-layer features in frame level, and used to weight the corresponding shallow-layer features in frame level, wherein deep integrated features are obtained in the feature integration network by dimension reduction or normalization processing on concatenation or accumulation of different types of weighted shallow-layer features in frame level;

speech task processing unit which comprises a frame-level speech task processing unit and a segment-level speech task processing unit, wherein the frame-level speech task processing unit is configured to receive the frame-level deep integrated feature vectors of the testing speech, to perform calculations on the neural network to complete specific frame-level speech tasks, and wherein the segment-level speech task processing unit is configured to obtain the segment-level deep integrated feature vectors by aggregating the frame-level deep integrated feature vectors of the testing speech in a statistics pooling layer, to perform calculations on the neural network to complete specific segment-level speech task.

This application provides a multi-type acoustic feature integration method and system based on deep neural networks. According to a specific speech task, a multi-type acoustic feature integration model with optimal network parameters is built, which is used to obtain frame-level deep integrated feature vectors or the segment-level deep integrated feature vectors, and wherein the frame-level/segment-level deep integrated feature vectors is processed by the neural network according to the specific speech task, and the specific speech task is finally completed, wherein the multi-type acoustic feature integration model comprises the frame-level acoustic feature extraction, the frame-level shallow-layer feature vector acquisition, and the frame-level/segment-level deep integrated feature vectors acquisition.

wherein after the loss function calculation according to the specific speech task, the network parameters of the whole deep learning networks are updated with backpropagation algorithm.

wherein the solution supports the extraction of multiple acoustic feature integration vectors in speech tasks such as speech recognition, speech wake-up, spoken language recognition, speaker recognition, and anti-spoofing etc. It explores the internal correlation between multiple acoustic features according to specific speech tasks. By making full use of the distinction and complementarity between different types of acoustic features, the entire deep neural networks are joint optimized with the acoustic feature integration process, to obtain the frame-level or segment-level deep integrated feature vectors of the task-related adaptation. The performances of the speech processing systems are improved in terms of the accuracy and robustness in specific speech applications.

BRIEF DESCRIPTION OF DRAWINGS

By reading the detailed description of non-limiting embodiments with reference to the following drawings, other features, purposes, and advantages of the present application will become more apparent.

DETAILED DESCRIPTION

The application will be further described in detail below in conjunction with the drawings and embodiments. It can be understood that the specific embodiments described here are only used to explain the related application, but not to limit the application. In addition, it should be noted that, for ease of description, only the parts related to the related application are shown in the drawings.

It should be noted that, the embodiments in the application and the features in the embodiments can be combined with each other if there is no conflict. Hereinafter, the present application will be described in detail with reference to the drawings and in conjunction with embodiments.

Figure 1:
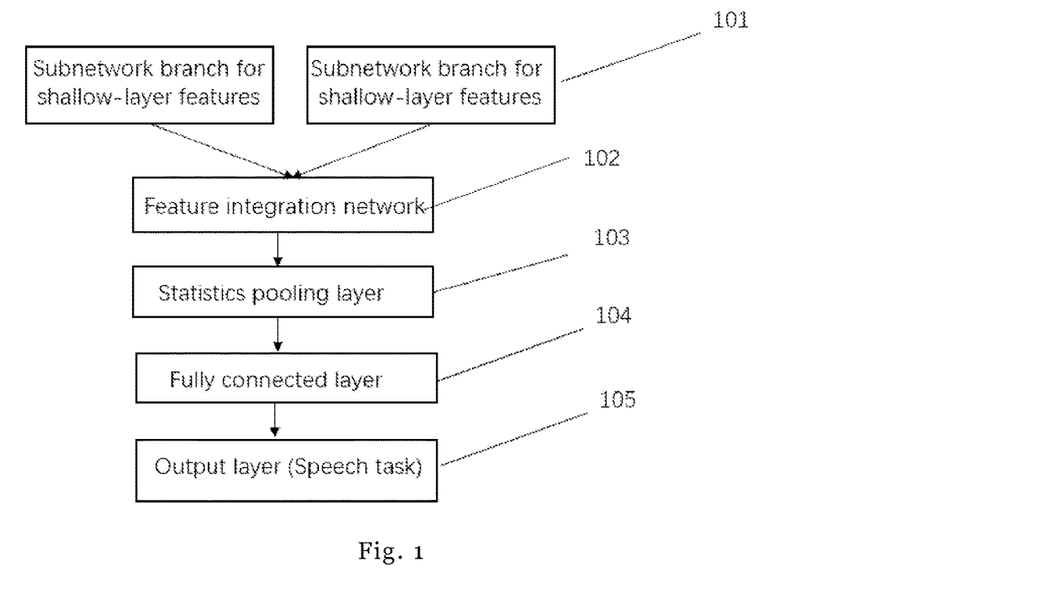
FIG. 1 is a schematic diagram of the structure of deep neural networks according to an embodiment of the present application.
Figure 2:
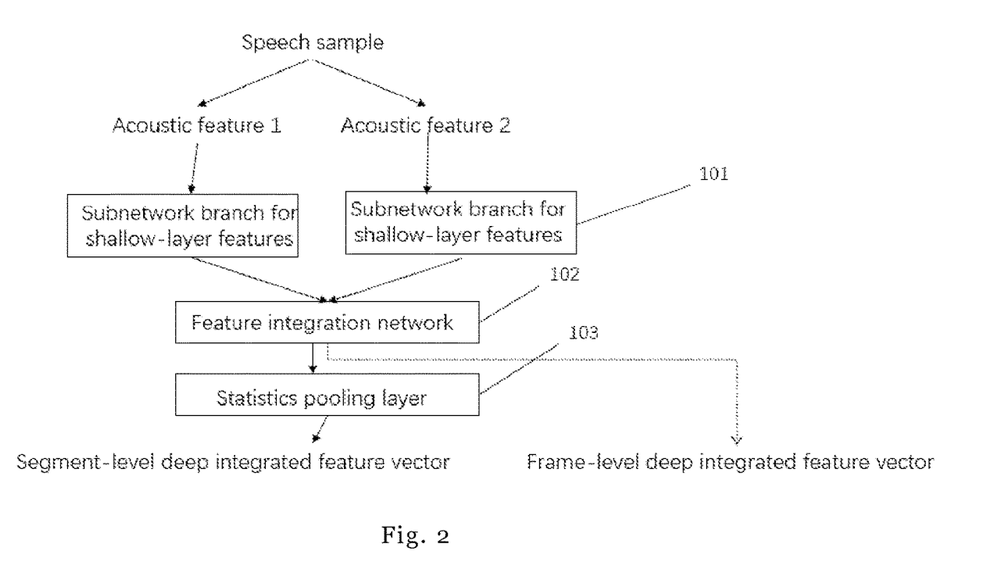
FIG. 2 is an overall schematic flow chart of a multi-type acoustic feature integration model based on deep neural networks according to an embodiment of the present application.

With reference to FIGS. 1 and 2, FIG. 1 shows a schematic diagram of deep neural networks according to an embodiment of the present application, and FIG. 2 shows the overall schematic flow chart of a multi-type acoustic feature integration model based on deep neural networks according to an embodiment of the present application. As shown, the deep neural networks of the multi-type acoustic feature integration model in the present application comprise at least two subnetwork branches for shallow-layer features 101, a feature integration network 102, a statistics pooling layer 103, a fully connected layer 104, and an output layer 105;

wherein multiple subnetwork branches for shallow-layer features 101 are connected to a feature integration network 102;

wherein the feature integration network 102 is optionally connected to the fully connected layer 104 and then to the output layer 105; as an alternative, the feature integration network 102 is also connected to the statistics pooling layer 103, the fully connected layer 104, and the output layer 105 in sequence;

wherein the speech samples in the labeled speech data set are preprocessed to obtain different types of frame-level acoustic feature 1 and frame-level acoustic feature 2, and wherein the frame-level acoustic feature 1 and frame-level acoustic feature 2 are input into the corresponding subnetwork branch for shallow-layer features 101 with neural network nonlinear operations processing, to obtain the frame-level shallow-layer feature vectors, and wherein the frame-level shallow-layer feature vectors are input into the feature integration network 102 to combine with the attention mechanism in neural network to calculate the contribution weight and then perform weighted integration processing to obtain the frame-level deep integrated feature vectors, and wherein according to the requirements of the specific speech tasks, determine whether it is necessary to convert the frame-level deep integrated feature into a segment-level deep integrated feature.

wherein if "Yes", the frame-level deep integrated feature vectors are input to the statistics pooling layer 103 for aggregation into a segment-level deep integrated feature vector, and then transmitted through the fully connected level 104 and output layer 105;

wherein if "No", the frame-level deep integrated feature vectors are directly transmitted through the fully connected layer 104 and the output layer 105;

wherein after calculating the loss function according to the specific speech task, the network parameters are updated with the backpropagation algorithm.

In some specific embodiments, the neural networks can be but not limited to: deep neural networks (DNN), convolutional neural networks (CNN), recurrent neural networks (RNN), time delay neural networks (TDNN), residual neural networks (ResNet), etc.

Figure 3:
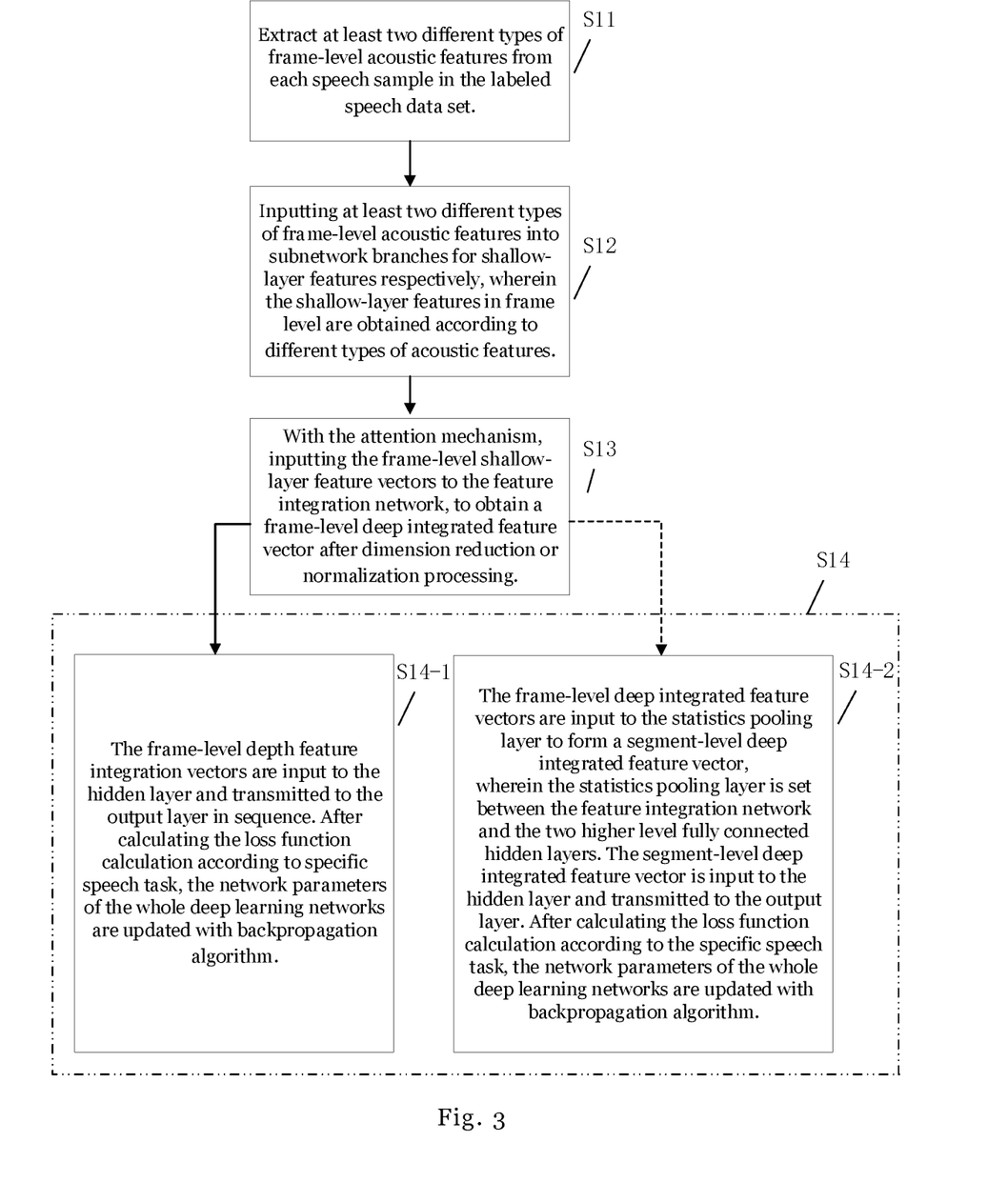
FIG. 3 is a network parameter training flow chart of a multi-type acoustic feature integration model based on deep neural networks according to an embodiment of the present application.

FIG. 3 shows a network parameter training flow chart of a multi-type acoustic feature integration model based on deep neural networks according to an embodiment of the present application. As shown in FIG. 3, the method comprises the steps of frame-level acoustic features, frame-level shallow-layer feature vectors, frame-level deep integrated feature vectors, and speech task processing.

In Step S11: extract at least two different types of frame-level acoustic features from each speech sample in the labeled speech data set.

In this step, the multiple different types of frame-level acoustic features are extracted from the speech sample in labeled speech data set. The appropriate type of frame-level acoustic features can be selected according to the specific speech task. At present, the popular acoustic features include many types of acoustic features, such as Mel filter bank feature (FBank), Mel cepstral coefficient feature (MFCC), perceptual linear prediction feature (PLP), and spectrogram feature (Spectrogram).

In some specific embodiments, for the speech tasks like speech recognition and speech wake-up, FBank and PLP are popularly employed; for the speech tasks like spoken language recognition, FBank and PLP are frequently adopted; for the speech task like speaker recognition, MFCC and PLP are used as mainstream acoustic features; for the speech task like anti-spoofing task, FBank and Spectrogram are commonly implemented;

wherein extracting multiple different types of frame-level acoustic features to perform related operations according to specific speech tasks in subsequent steps, will circumvent the problem of low accuracy rate in speech applications, which is usually caused by utilizing only a single type of acoustic feature.

In some specific embodiments, before the extraction of different types of frame-level acoustic features for the speech samples in the labeled speech data set, the speech samples need to be preprocessed. Framing is one of the preprocessing steps, and the speech samples are divided into frames. The specific frame length and frame shift parameters should be specified according to the specific speech task.

In some preferred embodiments, when the speech task is to identify the speaker, the frame length is usually set as 25 milliseconds, and the frame shift is set as 10 milliseconds.

In some specific embodiments, according to the requirements of the speech tasks and the characteristic of the specific acoustic features, the preprocessing step may optionally perform a windowing operation on the speech samples after framing, to smooth the transition between different frames. It is optional to choose a Hamming window, a Blackman window, etc.

In some specific embodiments, according to the requirements of specific speech tasks, the preprocessing step may optionally employ a silence detection algorithm (voice activity detection, VAD) to determine whether each frame of a speech sample is a silent frame, after the calculation of the frame-level acoustic features for each frame. One can choose to keep or remove the speech frame which has been determined as a silent frame, according to the specific requirement of the speech task.

In Step S12: inputting at least two different types of frame-level acoustic features into subnetwork branches for shallow-layer features respectively, wherein the shallow-layer features in frame level are obtained according to different types of acoustic features.

In this step, different types of frame-level acoustic features are input into corresponding subnetwork branches for shallow-layer features respectively, and frame-level shallow-layer feature vectors for specific speech tasks are extracted with neural network nonlinear operations.

In Step S13: with the attention mechanism, inputting the frame-level shallow-layer feature vectors to the feature integration network, to obtain a frame-level deep integrated feature vector after dimension reduction or normalization processing.

In this step, in the feature integration network, the contribution weight is calculated for each type of shallow-layer features in frame level, to weight the shallow-layer features in frame level, wherein frame-level deep integrated features are obtained by dimension reduction or normalization processing on concatenation or accumulation of different types of weighted shallow-layer features in frame level.

In some specific embodiments, after weighting processing and integration processing, the frame-level preliminary integrated feature vectors are obtained, and then transmitted to dimension reduction or normalization processing. This step can be implemented through one or several fully connected layers to obtain frame-level deep integrated feature vectors.

In some specific embodiments, the dimension reduction and the normalization processing can be completed respectively by one neural network structure, or by multiple different neural network structures.

In Step S14-1: the frame-level depth feature integration vectors are input to the hidden layer and transmitted to the output layer in sequence. After calculating the loss function calculation according to specific speech task, the network parameters of the whole deep learning networks are updated with backpropagation algorithm.

In Step S14-2: the frame-level deep integrated feature vectors are input to the statistics pooling layer to form a segment-level deep integrated feature vector, wherein the statistics pooling layer is set between the feature integration network and the two higher level fully connected hidden layers. The segment-level deep integrated feature vectors is input to the hidden layer and transmitted to the output layer. After calculating the loss function calculation according to the specific speech task, the network parameters of the whole deep learning networks are updated with backpropagation algorithm.

In this step, according to the requirements of the specific speech task, it is determined whether it is necessary to convert the frame-level deep integrated feature to the segment-level deep integrated feature.

If "No", perform Step S14-1 to directly output the frame-level deep integrated feature vectors through the fully connected layer and the output layer;

if "Yes", perform Step S14-2 to input the frame-level deep integrated feature vectors into the statistics pooling layer for aggregation into a segment-level deep integrated feature vector, and then output it through the fully connected layer and the output layer.

And after Step S14-1 or Step S14-2 is performed, the loss function is calculated according to the specific speech task to update the network parameters of all the above-mentioned neural networks, so as to realize the joint optimization training of the entire deep neural network to obtain a multi-type acoustic feature integration model based on the optimal deep neural networks.

In some specific embodiments, the step of forming the segment-level deep integrated feature vectors specifically comprises:

inputting the frame-level deep integrated feature vectors to the statistics pooling layer, and aggregating all the frame-level deep integrated feature vectors of a speech segment;

calculating separately the mean and standard deviation corresponding to the frame-level deep integrated feature vectors;

the segment-level deep integrated feature vectors is obtained by the concatenation of the mean and standard deviation vectors.

In some specific embodiments, in the training phase, determination is made according to the recognition results of specific speech task, and the acoustic feature extraction, shallow-layer feature vectors acquirement and feature integration steps are jointly trained to optimize network parameters and obtain multi-type acoustic feature integration model based on deep neural networks for specific speech tasks, to improve robustness and recognition rate in the specific speech applications of this application.

Figure 4:
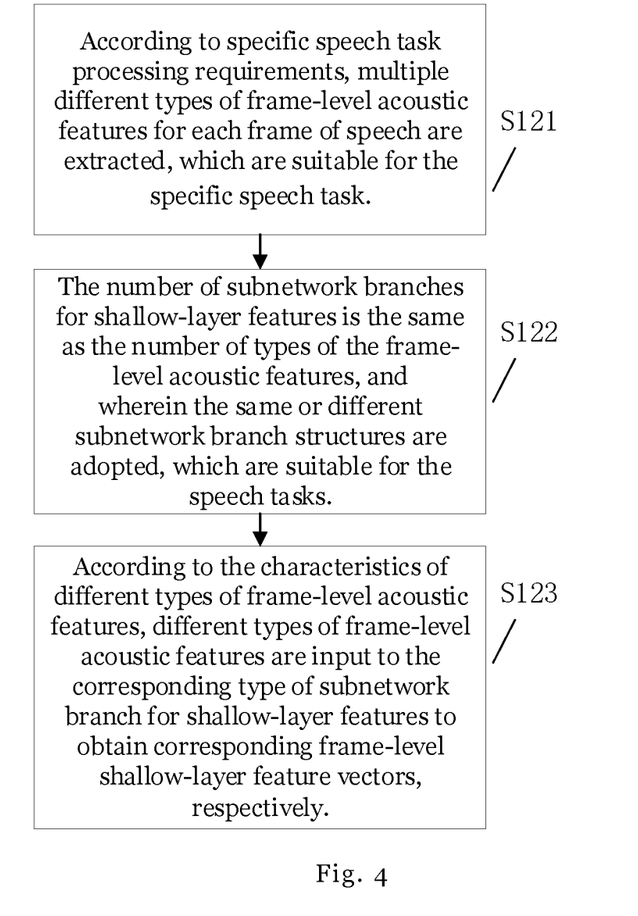
FIG. 4 is a flow chart of subnetwork branch training for shallow-layer features in a multi-type acoustic feature integration model based on deep neural networks according to an embodiment of the present application.

Continuing to refer to FIG. 4, it shows a flow chart of subnetwork branch training for shallow-layer features in a multi-type acoustic feature integration model based on deep neural networks according to an embodiment of the present application. The specific process comprises the following steps:

Step 121: according to specific speech task processing requirements, multiple different types of frame-level acoustic features for each frame of speech are extracted, which are suitable for the specific speech task.

In some specific embodiments, different types of frame-level acoustic features for each frame in a speech segment are extracted from the speech samples in the labeled speech data set according to specific speech tasks, such as FBank, MFCC, PLP, Spectrogram, etc.;

wherein, at least two types of acoustic features for each frame of speech are extracted, to execute multiple types of frame-level shallow-layer feature vectors acquisition step.

Step 122: The number of subnetwork branches for shallow-layer features is the same as the number of types of the frame-level acoustic features, and wherein the same or different subnetwork branch structures are adopted, which are suitable for the speech tasks.

In some specific embodiments, each subnetwork branch for shallow-layer features is independent of each other in the process of forward propagation and backpropagation parameters iteration, and the optional network structures are also different. For example, a 3-layer TDNN network or a 4-layer TDNN network or a 4-layer CNN network can be selected as the network structure of the subnetwork branch for shallow-layer features.

Step 123: According to the characteristics of different types of frame-level acoustic features, different types of frame-level acoustic features are input to the corresponding type of subnetwork branch for shallow-layer features to obtain corresponding frame-level shallow-layer feature vectors, respectively.

In some specific embodiments, the specific network structure of each subnetwork branch for shallow-layer features should be selected according to the requirements of the specific speech task;

wherein with the most suitable neural network structure for each subnetwork branch, the frame-level shallow-layer feature vectors related to the specific speech task are obtained, by transmitting different types of frame-level acoustic features through the corresponding subnetwork branch.

In some preferred embodiments, when the frame-level acoustic features are MFCCs, 3-layer TDNN network can be selected as the subnetwork branch for shallow-layer features, to extract the frame-level shallow-layer feature vectors;

wherein when the frame-level acoustic features are perceptual prediction features, 4-layer TDNN network can be selected as the subnetwork branch for shallow-layer features, to extract the frame-level shallow-layer feature vectors;

wherein when the frame-level acoustic feature is a spectrogram feature, 4-layer CNN network can be selected as the subnetwork branch for shallow-layer features, to extract the frame-level shallow-layer feature vectors.

In some specific embodiments, taking three different types of frame-level acoustic features and the corresponding three subnetwork branches for shallow-layer features as examples, the subnetwork branches for shallow-layer features are used to perform neural network nonlinear operation processing on three different types of frame-level acoustic features in the same frame respectively, the specific expression formula is as follows:

$$F_1 = D(f_1)_a, F_2 = D(f_2)_b, F_3 = C(f_3)$$

where $f_i$ represents the i-th frame-level acoustic feature, $D(f_i)$ represents the time-delay neural network, $D(f_i)_a$ represents a deep time-delay neural network in certain network configuration (such as configuration a), $D(f_i)_b$ represents a deep time-delay neural network with another network configuration (such as configuration b), $C(f_i)$ represents the convolutional neural network, $F_i$ represents the i-th frame-level shallow-layer feature vector, i=1, 2, 3. According to specific speech tasks, different types of frame-level acoustic features adopt different neural networks to perform neural network nonlinear operation processing, and obtain corresponding frame-level shallow-layer feature vectors.

Figure 5:
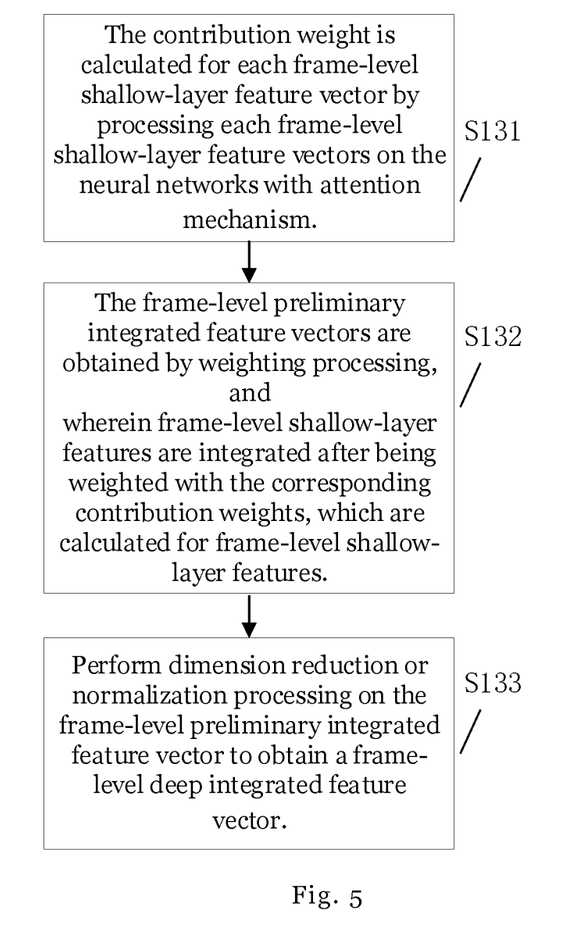
FIG. 5 is a deep neural network training flow chart of a multi-type acoustic feature integration model based on deep neural networks according to an embodiment of the present application.

Continue to refer to FIG. 5, which shows a deep neural network training flow chart of a multi-type acoustic feature integration model based on deep neural networks in an embodiment of the present application. The specific process comprises the following steps:

Step 131: the contribution weight is calculated for each frame-level shallow-layer feature vector by processing each frame-level shallow-layer feature vectors on the neural networks with attention mechanism.

In some specific embodiments, contribution weights are calculated to present the contribution of each frame-level shallow-layer feature vector with the attention mechanism;

wherein the contribution of each frame-level shallow-layer feature vector is determined by using the attention mechanism in the neural networks. The mathematical formula is as follows:

$$u_i = v_m^T \tanh(W_e F_i + b_e)$$

$$a_i = \frac{\exp(u_i)}{\sum_i^N \exp(u_n)}$$

where m represents the number of input nodes of the attention mechanism layer, $v_m^T$, represents the transpose of the identity matrix with the number of rows m, function tan h ( ) represents the activation function, $W_e$ and $b_e$ represent learnable parameters with the attention mechanism, $F_i$ represents the i-th frame-level shallow-layer feature vector, N represents the number of types of frame-level acoustic features, $a_i$ represents the contribution weight value (probability) of the i-th frame-level acoustic feature, $u_i$ represents the contribution value of the i-th frame-level acoustic feature, i=1, 2, ..., N, N represents the number of types of frame-level acoustic features.

Step 132: the frame-level preliminary integrated feature vectors are obtained by weighting processing, and wherein frame-level shallow-layer features are integrated after being weighted with the corresponding contribution weights, which are calculated for frame-level shallow-layer features.

In some specific embodiments, the frame-level preliminary integrated feature vector can be obtained in the following two methods:

In the first method, based on the contribution weights of each frame-level shallow-layer feature vector obtained by the attention mechanism in the neural network, weighting operation and concatenation are performed on multiple types of frame-level shallow-layer feature vectors. The mathematical formula is as follows:

$$I = \text{Concat}(a_1 F_1, a_2 F_2, \ldots, a_N F_N)$$

where I represents the frame-level preliminary integrated feature vectors, function Concat ( ) represents a concatenation operation, $F_1, F_2, \ldots, F_N$ respectively represent the frame-level shallow-layer feature vectors, and $a_1, a_2, \ldots, a_N$ respectively represent the corresponding contribution weights, and N represents the number of types of frame-level acoustic features.

In the second method, based on the contribution weights of each frame-level shallow-layer feature vectors obtained by the attention mechanism in the neural network, weighting operation and accumulation processing are performed on multiple types of frame-level shallow-layer feature vectors. The mathematical formula is as follows:

$$I = \sum_{i=1}^{N} a_i F_i$$

where I represents the frame-level preliminary integrated feature vectors, $F_i$ represents the frame-level shallow-layer feature vectors, $a_i$ respectively represents the corresponding contribution weight, and N represents the number of types of frame-level acoustic features.

Step 133: Perform dimension reduction or normalization processing on the frame-level preliminary integrated feature vector to obtain a frame-level deep integrated feature vector.

In some specific embodiments, the mathematical formula for performing dimension reduction on frame-level preliminary integrated feature vectors I is as follows:

$$I_{low} = L(I)$$

where L(I) represents the function of dimension reduction, $I_{low}$ represents the frame-level deep integrated feature vectors after dimension reduction, its dimension should be less than or equal to the dimension of I, I represents the frame-level preliminary integrated feature vectors. By performing dimension reduction on the frame-level preliminary integrated feature vector, the frame-level deep integrated feature vectors after dimension reduction integration is obtained.

In some specific embodiments, the mathematical formula for performing normalization operation on frame-level preliminary integrated feature vectors I is as follows:

$$I_{norm} = \frac{I - \mu}{\sigma}$$

where $I_{norm}$ represents the normalized feature vectors, I represents the frame-level preliminary integrated feature vectors, μ represents the mean of I, σ represents the variance of I.

Figure 6:
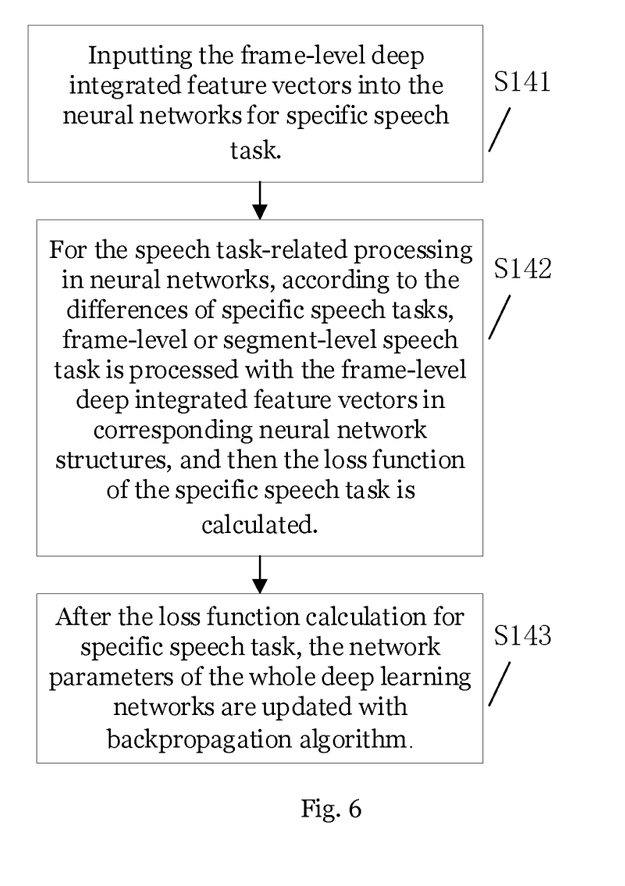
FIG. 6 is a neural network training flow chart with the multi-type acoustic feature integration model for the specific speech tasks according to an embodiment of the present application.

Continuing to refer to FIG. 6, it shows a neural network training flow chart with the multi-type acoustic feature integration model for the specific speech tasks according to an embodiment of the present application.

Step 141: Inputting the frame-level deep integrated feature vectors into the neural networks for specific speech task.

Step 142: For the speech task-related processing in neural networks, according to the differences of specific speech tasks, frame-level or segment-level speech task is processed with the frame-level deep integrated feature vectors in corresponding neural network structures, and then the loss function of the specific speech task is calculated.

Step 143: after the loss function calculation for specific speech task, the network parameters of the whole deep learning networks are updated with backpropagation algorithm.

In some specific embodiments, the speech tasks comprise speech recognition, speech wake-up, spoken language recognition, speaker recognition, anti-spoofing, etc. The task of speech recognition is to recognize the specific text content in the speech; the task of speaker recognition is to determine the speaker identity for one speech utterance. Among them, the speech recognition task and the speech wake-up task are frame-level speech processing tasks, and the speaker recognition task, spoken language recognition task, and anti-spoofing task are segment-level speech processing tasks.

In some specific embodiments, when the speaker recognition task is a segment-level speech task that needs to be processed, the x-vector network can be selected correspondingly as the network framework for speaker recognition tasks. The input of the x-vector network is in frames, which utilizes TDNN network. In the x-vector network, the statistics pooling layer is used to calculate the mean and standard deviation of each speech segment, to realize the conversion from the frame-level shallow-layer feature vectors to the segment-level deep integrated feature vectors, and calculates the probability that a segment-level feature belongs to a particular speaker.

In some specific embodiments, when the speech task is a task of processing the speaker recognition task, obtaining the corresponding speech task result relates to obtain the probability that a speech segment belongs to a certain speaker.

In some specific embodiments, for processing the task of speaker recognition, in the training phase, after a speech segment belonging to a certain speaker is received, the softmax is used as the loss function, and then the backpropagation is performed, and the stochastic gradient descent algorithm (SGD) is used to update the network parameters. The mathematical expression of softmax is as follows:

$$L_S = -\frac{1}{n}\sum_{i=1}^{n}\log\frac{e^{W_{y_i}^T f_i}}{\sum_{j=1}^{c}e^{W_j^T f_i}},$$

where n represents the number of speakers in the training set, $f_i$ represents the input for the last hidden layer for the i-th speaker, $W_{y_i}^T$ represents a learnable parameter of the y-th node in the output layer corresponding to the i-th speaker, j represents the j-th output node of the last hidden layer, $W_j^T$ represents a learnable parameter in the last hidden layer corresponding to the j-th node, c represents the total number of output nodes of the last hidden layer, and usually c=n. The calculation by the softmax function can optimize the parameters of the neural network in speech recognition.

In some specific embodiments, during the test phase of the speaker recognition task, if it is a closed-set test task for speaker recognition (speaker identification), a speech segment is input to obtain the probability that a speech segment belongs to each speaker;

wherein if it is an open-set test task for speaker recognition (speaker verification), an enrollment speech segment is input so as to extract the parameters of the affine transformation layer from a hidden layer as the speaker's segment-level deep integrated feature vectors, and wherein a segment of test speech is input to extract the segment-level deep integrated feature vectors of the speaker to be tested, and wherein the similarities of two segment-level deep integrated feature vectors are compared, for example using the Cosine distance, so as to obtain the confidence that the two speech segments belong to the same person. The mathematical expression for similarity determination by Cosine distance is as follows:

$$sim(X, Y) = \cos\theta = \frac{\vec{x}\vec{y}}{\|x\|\cdot\|y\|}$$

where sim(X,Y) represents the confidence score of these two X, Y speeches that are assumed to belong to the same speaker, $\vec{x}$ represents speaker's segment-level deep integrated feature vectors for speech X, $\vec{y}$ represents speaker's segment-level deep integrated feature vectors for speech Y.

In some specific embodiments, a speech recognition task is the speech task to be processed. In the speech recognition task, the goal of the speech task is to determine what phoneme or state the content of each speech frame is assigned to.

In some specific embodiments, a speech recognition task is the frame-level speech task to be processed. In order to deal with the speech recognition task, the DNN-HMM network (Deep Neural Network-Hidden Markov Model) can be selected as the network architecture of the speech recognition task. Frame-level speech samples are used as the input of the DNN-HMM network is, and are processed by the TDNN network; and wherein the whole procedure is performed with the frame-level feature, calculating the probability of a certain phoneme or state that a frame-level deep integrated feature vector of each frame is assigned to.

In some specific embodiments, when the speech task is a speech recognition task, obtaining the corresponding speech task result relates to obtain the probability of a certain phoneme that a speech frame is assigned to.

In some specific embodiments, the speech recognition task is processed. In the training phase, the posterior probability of a speech frame belonging to some phoneme or state is obtained, and the Cross Entropy is calculated as the loss function, and then backpropagation is performed and stochastic gradient descent algorithm (SGD) is used to update the network parameters. The mathematical expression of the Cross Entropy is as follows:

$$J_{CE}(\theta; 0, w) = -\frac{1}{M}\sum_{1}^{M}\sum_{i=1}^{C}w_i \log v_i^L$$

$$w_i = \begin{cases} 1, & y_{predict} = y_{truth} \\ 0, & \text{else} \end{cases},$$

where $\theta$ represents a model parameter, M is a natural integer and represents the number of samples in the training set, C is a natural integer and represents the number of phonemes or states in the training set, $v_i^L$ represents the input for the last hidden layer, and represents the probability that the observation vector O is assigned to the phoneme or the state for the i-th class, which is predicted by the network, the condition $y_{predict}=y_{truth}$ represents that the observation sequence is consistent with the label sequence, $w_i$ is the weight according to the condition, which has a value of 0 or 1.

In some specific embodiments, the speech recognition task is processed. In the testing phase, a speech segment is input, and the network outputs the probability of a phoneme or state that each frame of the speech segment is assigned to.

In some specific embodiments, in the training phase, the acoustic feature extraction step, the frame-level shallow-layer feature vector acquisition step, the frame-level deep integrated feature vectors acquisition step, and the speech task processing step are optimized and trained jointly, so that various neural network performances in the speech task processing step are optimized. Using loss function to optimize the relevant network parameters of each step, so that the requirements of the specific speech task are more matched by each step, and the accuracy and stability of the overall multi-type acoustic feature integration model are improved.

In some preferred embodiments, let $L_s$ represent a loss function of the speech task processing step, $L_e$ represent a loss function of shallow-layer features, $L_i$ represent a loss function of feature integration, $L_f$ represent the total loss function of joint training, then $L_f=L_s$, or $L_f=(1-\alpha)L_s+\alpha L_e$, where $\alpha \subset (0,1)$, or $L_f=(1-\alpha-\beta)L_s+\alpha L_e+\beta L_i$, where $\alpha \subset (0, 1)$, $\beta \subset (0,1)$, and $(\alpha+\beta)<1$.

Figure 7:
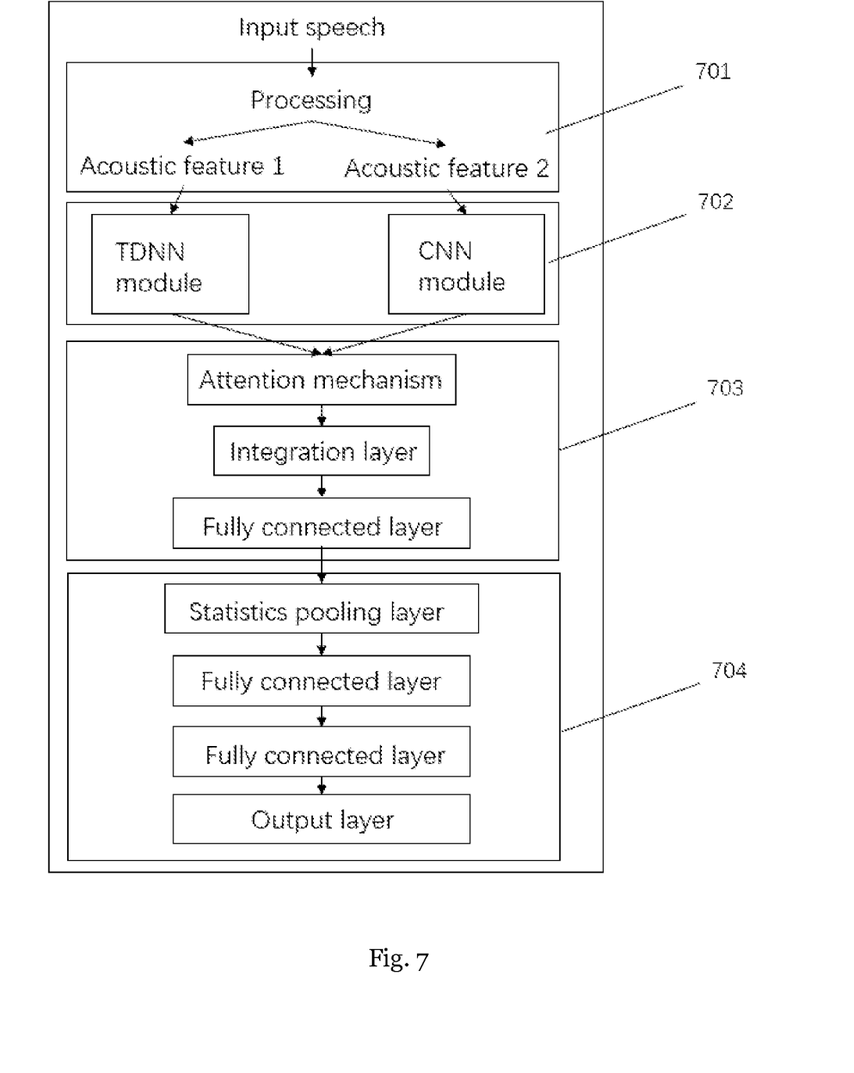
FIG. 7 is a network structure diagram for segment-level speech tasks with a multi-type acoustic feature integration model based on deep neural networks according to an embodiment of the present application.

Continuing to refer to FIG. 7, it shows a diagram of network structure for processing frame-level speech tasks using a multi-type acoustic feature integration model of a deep neural network according to an embodiment of the present application. As shown, when the speech tasks are speaker recognition tasks, spoken language recognition tasks, and anti-spoofing tasks, the speech tasks with the multi-type acoustic feature integration model are implemented by segment-level speech processing structures. The specific network structure comprises an acoustic feature extraction structure 701, a vector neural network module for frame-level shallow-layer feature 702, a neural network structure for frame-level deep integrated feature vector 703, and a neural network structure for segment-level speech task processing 704.

wherein the testing speech is input into the acoustic feature extraction structure 701 for preprocessing such as framing, silence detection processing, and windowing, to obtain frame-level acoustic feature 1 and frame-level acoustic feature 2; and wherein the frame-level acoustic feature 1 and the frame-level acoustic feature 2 are input to the TDNN subnetwork branch for shallow-layer features and the CNN subnetwork branch for shallow-layer features respectively;

wherein the shallow-layer features are input into the neural network structure of frame-level deep integrated feature vector 703 respectively to be weighted by the corresponding contribution weights which are calculated with the attention mechanism, and wherein frame-level deep integrated feature vectors are obtained by dimension reduction or normalization processing in the fully connected layer after the concatenation or accumulation of different types of weighted shallow-layer features; and wherein the statistics pooling layer in the neural network structure of frame-level speech task processing 704 is used to calculates the mean and standard deviation for each speech segment, in order to realize the conversion from the frame-level deep integrated feature vectors to the segment-level deep integrated feature vectors; and wherein the segment-level deep integrated feature vectors is transmitted through the fully connected layer for speech task processing, and the recognition result of the specific speech task are output.

Figure 8:
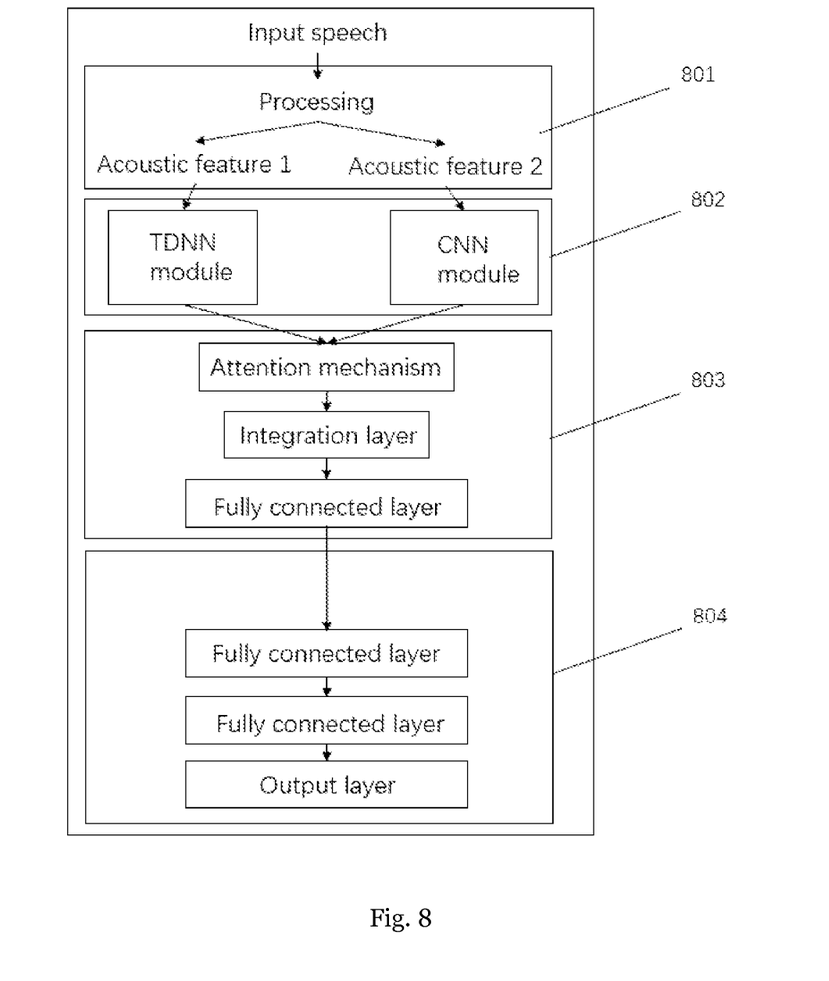
FIG. 8 is a network structure diagram for frame-level speech tasks with a multi-type acoustic feature integration model based on deep neural networks according to an embodiment of the present application.

Continuing to refer to FIG. 8, it shows a network structure diagram for processing frame-level speech tasks using a multi-type acoustic feature integration model of a deep neural network according to an embodiment of the present application. As shown, when the speech tasks are speech recognition tasks and speech wake-up tasks, the speech tasks with the multi-type acoustic feature integration model adopt frame-level processing structure. The specific network structure comprises an acoustic feature extraction structure 801, a neural network structure for frame-level shallow-layer feature vector 802, a neural network structure for frame-level deep integrated feature vector 803, and a neural network structure for frame-level speech task processing 804.

wherein since the specific flow and structure of the acoustic feature extraction structure 801, the neural network structure for frame-level shallow-layer feature vector 802, and the neural network structure for frame-level deep integrated feature vector 803 in the frame-level speech processing structure are the same as those in FIG. 7, for the sake of concise of the description, they won't be reiterated here; and wherein after dimension reduction or normalization through the fully connected layer of the neural network structure for frame-level deep integrated feature vector 803, the fully connected layer of the neural network structure for frame-level speech task processing 804 is directly input into the frame-level speech task processing structure to perform the speech task, and the probability of each frame belonging to some phoneme or state is output.

Figure 9:
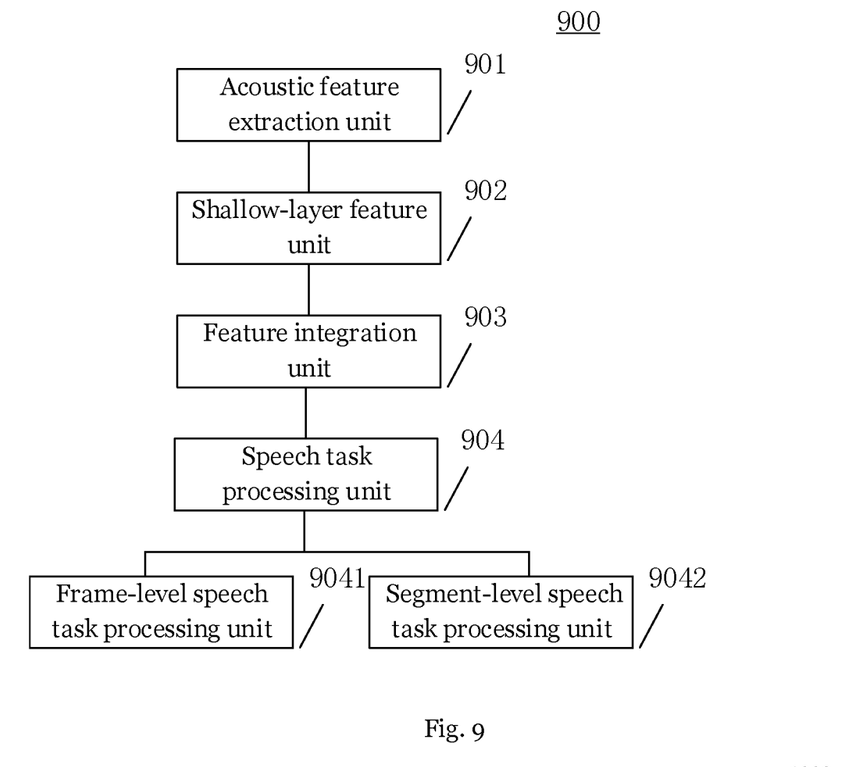
FIG. 9 is a schematic diagram of a multi-type acoustic feature integration system based on deep neural networks according to an embodiment of the present application.

In addition, this application also proposes a multi-type acoustic feature integration system based on deep neural networks. As shown in FIG. 9, a multi-type acoustic feature integration system based on deep neural networks 900 comprises an acoustic feature extraction unit 901, a shallow-layer feature unit 902, a feature integration unit 903, and a speech task processing unit 904.

wherein the acoustic feature extraction unit 901 is used to preprocess the testing speech and extract at least two different types of frame-level acoustic features; and wherein the shallow-layer feature unit 902 is used to perform neural network nonlinear calculations with the at least two different types of frame-level acoustic features for the input testing speech, to extract frame-level shallow-layer feature vectors for speech task-related information; and wherein the feature integration unit 903 is configured to receive at least two different types of frame-level shallow-layer feature vector of the testing speech in a feature integration network, and output a frame-level deep integrated feature vector of the testing speech with the attention mechanism; and wherein the speech task processing unit 904 comprises a frame-level speech task processing unit 9041 and a segment-level speech task processing unit 9042, wherein the frame-level speech task processing unit 9041 is used to input the frame-level deep integrated feature vectors of the testing speech in the hidden layer, to perform neural network calculations, so as to complete frame-level specific speech task;

wherein the segment-level speech task processing unit 9042 is used to aggregate the frame-level deep integrated feature vectors of the testing speech into the segment-level deep integrated feature vectors in the statistics pooling layer, which segment-level deep integrated feature vectors are input into the fully connected layer for neural network calculations to complete the segment-level specific speech task.

Figure 10:
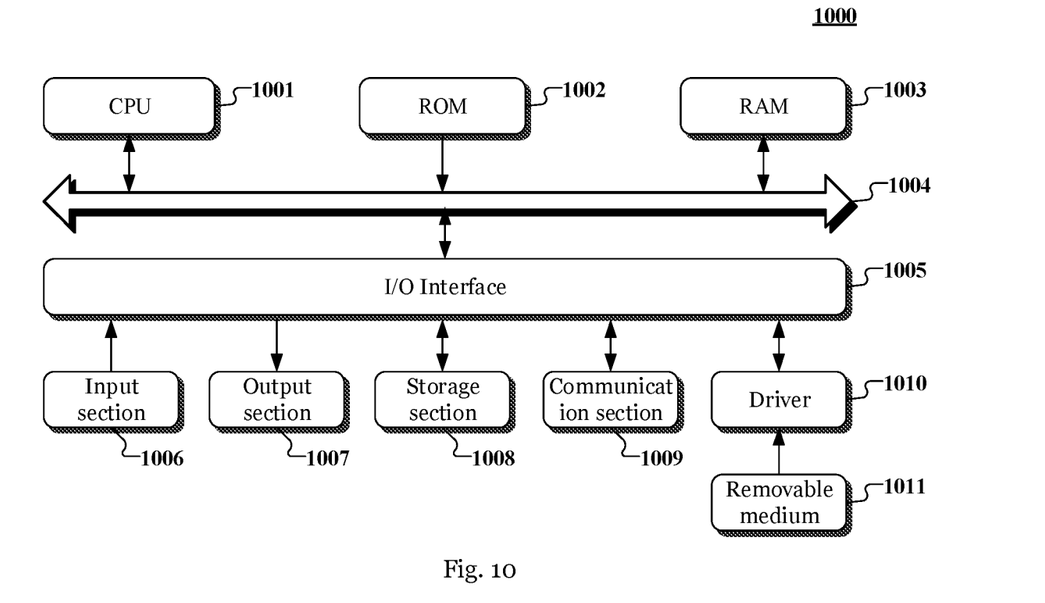
FIG. 10 is a schematic diagram of a computer system suitable for implementing the electronic device of the embodiment of the present application.

Referring now to FIG. 10, it shows a schematic structural diagram of a computer system 1000 suitable for implementing an electronic device according to an embodiment of the present application. The electronic device shown in FIG. 10 is only an example, and should not bring any limitation to the function and scope of use of the embodiments of the present application.

As shown in FIG. 10, the computer system 1000 comprises a central processing unit (CPU) 1001, and wherein the central processing unit (CPU) 1001 performs various appropriate actions and processing according to a program stored in a read-only memory (ROM) 1002, or a program in a random-access memory (RAM) 1003 which is loaded from a storage section 1008; and wherein the RAM 1003, various programs and data required for the operations of the system 1000 are also stored; and wherein the CPU 1001, ROM 1002, and RAM 1003 are connected to each other through a bus 1004; and wherein an input/output (I/O) interface 1005 is also connected to the bus 1004.

The following components are connected to the I/O interface 1005: an input section 1003 comprising input portions such as a keyboard, a mouse, etc.; output portions 1004 such as a liquid crystal display (LCD), speakers, etc.; storage portions 1008 comprising a hard disk, etc.; and communication portions 1009 such as a local-area network (LNA) card, a modem etc. The communication portions 1009 performs communication processing via a network such as the Internet. A driver 1010 can also be connected to the I/O interface 1005 as required. A removable medium loll, such as a magnetic disk, an optical disk, a magneto-optical disk, a semiconductor memory, etc., is installed on the drive 1010 as required, so that the computer program read therefrom is installed into the storage portions 1008 as required.

In particular, according to an embodiment of the present disclosure, the process described above with reference to the flow chart can be implemented as a computer software program. For example, an embodiment of the present disclosure comprises a computer program product, which comprises a computer program carried on a computer-readable medium, and the computer program contains program code for executing the method shown in the flow chart. In such an embodiment, the computer program may be downloaded and installed from the network through the communication section 1009, and/or installed from the removable medium loll. When the computer program is executed by the central processing unit (CPU) 1001, it executes the above-mentioned functions defined in the method of the present application.

It should be noted that the computer-readable medium of the present application may be a computer-readable signal medium or a computer-readable medium or any combination of the above two. The computer-readable medium may be, for example, but not limited to, an electrical, magnetic, optical, electromagnetic, infrared, or semiconductor system, apparatus or device, or any combination of the above. More specific examples of computer-readable medium may comprise, but are not limited to: electrical connections with one or more wires, portable computer disks, hard disks, random access memory (RAM), read-only memory (ROM), erasable programmable Read only memory (EPROM or flash memory), optical fiber, portable compact disk read only memory (CD-ROM), optical storage device, magnetic storage device, or any suitable combination of the above. In this application, the computer-readable medium may be any tangible medium that contains or stores a program, and the program may be used by or in combination with an instruction execution system, apparatus, or device. In this application, a computer-readable signal medium may comprise a data signal propagated in a baseband or as a part of a carrier wave, and a computer-readable program code is carried therein. This propagated data signal can take many forms, including but not limited to electromagnetic signals, optical signals, or any suitable combination of the above. The computer-readable signal medium may also be any computer-readable medium other than the computer-readable medium, and the computer-readable medium may send, propagate or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

The computer program code used to perform the operations of this application can be written in one or more programming languages or a combination thereof. The programming languages comprise object-oriented programming languages—such as Java, Smalltalk, C++, Python, and conventional procedural programming languages-such as C programming language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flow charts and block diagrams in the drawings illustrate the possible implementation of the system architecture, functions, and operations of the system, method, and computer program product according to various embodiments of the present application. In this regard, each block in the flow chart or block diagram can represent a module, program segment, or part of code, and the module, program segment, or part of code contains one or more executable instructions for realizing the specified logical function. It should also be noted that, in some alternative implementations, the functions marked in the block may also occur in a different order from the order marked in the drawings. For example, two blocks shown one after another can actually be executed substantially in parallel, or they can sometimes be executed in the reverse order, depending on the functions involved. It should also be noted that each block in the block diagram and/or flow chart, and the combination of the blocks in the block diagram and/or flow chart, can be implemented by a dedicated hardware-based system that performs the specified functions or operations, or it can be realized by a combination of dedicated hardware and computer instructions.

The modules involved in the embodiments described in the present application can be implemented in software or hardware. The described module can also be set in the processor, for example, it can be described as: a processor comprises an acoustic feature extraction unit, a shallow-layer feature unit, a feature integration unit, and a speech task processing unit. Among them, the names of these modules do not constitute a limitation on the module itself under certain circumstances. For example, the acoustic feature extraction unit can also be described as "preprocessing the testing speech and extracting at least two different types of frame-level acoustic features of the testing speech".

As another aspect, this application also provides a computer-readable medium. The computer-readable medium may be comprised in the electronic device described in the above-mentioned embodiment; or it may exist alone without being assembled into the electronic device. The aforementioned computer-readable medium carries one or more programs. When the aforementioned one or more programs are executed by the electronic device, the electronic device: preprocess a testing speech and extract at least two different types of frame-level acoustic features of the testing speech; different types of subnetwork branches for shallow-layer features respectively input at least two different types of the frame-level acoustic features of the testing speech, and output frame-level shallow-layer feature vectors corresponding to at least two different types of frame-level acoustic features of the testing speech of each subnetwork branch for shallow-layer features; in a feature integration network, with the attention mechanism, input at least two different types of input frame-level shallow-layer feature vectors of the testing speech, and output a frame-level deep integrated feature vector of the testing speech; to input the frame-level deep integrated feature vectors of the testing speech in the hidden layer, perform neural network calculations to complete specific frame-level speech tasks; or to aggregate the frame-level deep integrated feature vectors of the testing speech into a segment-level deep integrated feature vector in the statistics pooling layer, and then input it into the fully connected hidden layer to perform neural network calculations to complete specific segment-level speech tasks.

The above description is only a preferred embodiment of the present application and an explanation of the applied technical principles. Those skilled in the art should understand that the scope of the invention involved in this application is not limited to the technical solutions formed by the specific combination of the above technical features, and should also cover the above technical features or technical solutions without departing from the above inventive concept. Other technical solutions formed by any combination of its equivalent features. For example, a technical solution formed by substituting the above features and the technical features disclosed in this application (but not limited to) with similar functions.

The invention claimed is:

1. A multi-type acoustic feature integration method based on deep neural networks, wherein, the method comprising:
   Step S1: training a multi-type acoustic feature integration model based on deep neural networks using labeled speech data set,
      wherein the deep neural networks comprise at least two subnetwork branches for shallow-layer features, and a feature integration network that supports multiple acoustic features,
      wherein contribution weights are calculated with attention mechanism for at least two types of shallow-layer features in frame level, and used to weight the shallow-layer features in frame level,
      wherein deep integrated features are obtained in the feature integration network by dimension reduction or normalization processing on concatenation or accumulation of different types of weighted shallow-layer features in frame level, and
      wherein the network parameters of the multi-type acoustic feature integration model are obtained or updated;
   Step S2: inputting multiple types of acoustic features extracted from a testing speech to the trained multi-type acoustic feature integration model, and extracting frame-level deep integrated feature vectors of the testing speech.

2. The multi-type acoustic feature integration method based on deep neural networks according to claim 1, the deep neural networks in Step S1 also comprise a statistics pooling layer that aggregates frame-level deep integrated feature vectors into segment-level deep integrated feature vectors, at least two fully connected hidden layers, and an output layer for specific speech tasks.

3. The multi-type acoustic feature integration method based on deep neural networks according to claim 2, wherein, Step S1 specifically comprises the following substeps:
   Step S11: extracting at least two different types of frame-level acoustic features from each speech sample in the labeled speech data set;
   Step S12: inputting at least two different types of frame-level acoustic features into subnetwork branches for shallow-layer features respectively,
      wherein the shallow-layer features in frame level are obtained according to different types of acoustic features;
   Step S13: with the attention mechanism, inputting the frame-level shallow-layer feature vectors to the feature integration network to obtain a frame-level deep integrated feature vector;
   Step S14: inputting the frame-level deep integrated feature vectors to the hidden layers and the output layer in sequence, and
      wherein after the loss function calculation according to the specific speech task, the network parameters of the whole deep learning networks are updated with backpropagation algorithm.

4. The multi-type acoustic feature integration method based on deep neural networks according to claim 3, wherein, Step S14 further comprises: inputting the frame-level deep integrated feature vectors into the statistics pooling layer to obtain segment-level deep integrated feature vectors,
   wherein the statistics pooling layer is set between the feature integration network and two higher level fully connected hidden layers,
   wherein the segment-level deep integrated feature vectors are input to the hidden layers and transmitted to the output layer in sequence,
   wherein after the loss function calculation according to the specific speech task, the network parameters are updated with backpropagation algorithm.

5. The multi-type acoustic feature integration method based on deep neural networks according to claim 1, wherein, the feature integration network consists of one fully connected layer with the attention mechanism, one integration layer and one fully, connected layer.

6. The multi-type acoustic feature integration method based on deep neural networks according to claim 1, wherein, the mathematical formula of the concatenation processing is as follows:

$$I = \text{Concat}(a_1 F_1, a_2 F_2, \ldots, a_N F_N)$$

where I represents the frame-level preliminary integrated feature vectors, function Concat ( ) represents a concatenation operation, $F_1, F_2, \ldots, F_N$ represent the frame-level shallow layer feature vectors respectively, and $a_1, a_2, \ldots$, FN represent the corresponding contribution weights, and N represents the number of types of frame-level acoustic features; and the mathematical formula of the accumulation processing is as follows:

$$I = \sum_{i=1}^{N} a_i F_i$$

where I represents the frame-level preliminary integrated feature vectors, $F_i$ represents the frame-level shallow-layer feature vectors, $a_i$ respectively represents the corresponding contribution weight, and N represents the number of types of frame-level acoustic features.

7. The multi-type acoustic feature integration method based on deep neural networks according to claim 3, wherein, in Step S2, according to specific speech tasks, the different types of acoustic features for the testing speech are put into the trained multi-type acoustic feature integration model, and the frame-level deep integrated feature vectors of the testing speech are extracted from the feature integration network.

8. The multi-type acoustic feature integration method based on deep neural networks according to claim 4, wherein, the different types of acoustic features for the testing speech are put into the trained multi-type acoustic feature integration model, and the segment-level deep integrated feature vectors of the testing speech are extracted from the statistics pooling layer.

9. A non-transitory computer-readable storage medium with a computer program stored thereon, wherein, implements the method according to claim 1, when the program is executed by a processor.

* * * * *